(12) United States Patent
Lee et al.

(10) Patent No.: US 11,134,313 B2
(45) Date of Patent: Sep. 28, 2021

(54) ELECTRONIC APPARATUS AND METHOD OF CONTROLLING THE SAME

(71) Applicant: SAMSUNG ELECTRONICS CO., LTD., Suwon-si (KR)

(72) Inventors: Jonghyuk Lee, Suwon-si (KR); Beungchan Kim, Suwon-si (KR); Sehyun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/978,466

(22) PCT Filed: Mar. 8, 2019

(86) PCT No.: PCT/KR2019/002688
§ 371 (c)(1),
(2) Date: Sep. 4, 2020

(87) PCT Pub. No.: WO2019/172698
PCT Pub. Date: Sep. 12, 2019

(65) Prior Publication Data
US 2021/0044872 A1    Feb. 11, 2021

(30) Foreign Application Priority Data
Mar. 9, 2018  (KR) .................. 10-2018-0028264

(51) Int. Cl.
*H04N 9/80*       (2006.01)
*H04N 21/472*   (2011.01)
(Continued)

(52) U.S. Cl.
CPC ..... *H04N 21/47217* (2013.01); *H04N 21/218* (2013.01); *H04N 21/2387* (2013.01)

(58) Field of Classification Search
CPC ............ H04N 21/218; H04N 21/2387; H04N 21/26291; H04N 21/4312; H04N 21/4318;
(Continued)

(56) References Cited

U.S. PATENT DOCUMENTS

| 4,502,920 A | 3/1985 | Edwards |
| 7,853,343 B2 * | 12/2010 | Omata ...................... H04S 3/00 700/94 |

(Continued)

FOREIGN PATENT DOCUMENTS

| KR | 10-2007-0104703 | 10/2007 |
| KR | 10-2013-0055052 | 5/2013 |

(Continued)

OTHER PUBLICATIONS

International Search Report dated Jul. 2, 2019 from International Application No. PCT/KR2019/002688, 4pages.

*Primary Examiner* — Robert Chevalier
(74) *Attorney, Agent, or Firm* — Staas & Halsey LLP (57) ABSTRACT

An electronic apparatus includes: a signal receiver configured to receive a signal; a display; a communicator configured to communicate with an external apparatus; and a processor configured to: receive a signal of content corresponding to one format among a plurality of formats, request and receive playback information about the content corresponding to the format of the content from a server, perform a playback process with regard to the received signal of the content based on the playback information received from the server, and control the display to display an image of the content.

15 Claims, 8 Drawing Sheets

(51) Int. Cl.
*H04N 21/218* (2011.01)
*H04N 21/2387* (2011.01)

(58) Field of Classification Search
CPC ......... H04N 21/4348; H04N 21/47217; H04N 21/4722; H04N 21/643
USPC .................. 386/241, 239, 248, 264, 284
See application file for complete search history.

(56) References Cited

U.S. PATENT DOCUMENTS

| | | | |
|---|---|---|---|
| 2013/0312022 A1* | 11/2013 | Yoon ................ | H04N 21/44204 725/14 |
| 2014/0195635 A1 | 7/2014 | Li | |
| 2014/0232934 A1* | 8/2014 | Choi .............. | H04N 21/234309 348/441 |
| 2015/0242381 A1* | 8/2015 | Oh ........................ | H04L 51/066 715/204 |

FOREIGN PATENT DOCUMENTS

| | | |
|---|---|---|
| KR | 10-2016-0099958 | 8/2016 |
| KR | 10-2017-0102563 | 9/2017 |
| KR | 10-1795537 | 12/2017 |
| KR | 10-1821145 | 1/2018 |

* cited by examiner

ELECTRONIC APPARATUS AND METHOD OF CONTROLLING THE SAME

CROSS-REFERENCE TO RELATED APPLICATIONS

This application is a U.S. National Stage Application which claims the benefit under 35 U.S.C. § 371 of International Patent Application No. PCT/KR2019/002688 filed on Mar. 8, 2019, which claims foreign priority benefit under 35 U.S.C. § 119 of Korean Patent Application No. 10-2018-0028264 filed on Mar. 9, 2018 in the Korean Intellectual Property Office, the contents of each of which are incorporated herein by reference.

TECHNICAL FIELD

The disclosure relates to an electronic apparatus and a method of controlling the same, and more particularly to an electronic apparatus for playing back a content image, and a method of controlling the same.

BACKGROUND ART

A multimedia player running through a web application is embodied by middleware used for playing back multimedia content.

To play back the multimedia content received from a content provider, the multimedia player performs demultiplexing (or demuxing), decoding, rendering and the like image processing processes such as with regard to an image signal of content.

In this case, the demuxing of the image processing processes is to obtain information about attributes of the image signal by parsing a header included in the image signal of the content, and separate and extract video and audio data from the image signal based on the obtained information.

However, when specifications of a multimedia content file are updated or added with new functions such as a high data rate (HDR), hypertext transfer protocol (HTTP) live streaming (HLS), dynamic adaptive streaming over HTTP (DASH), etc. in the content provider, it is impossible for the multimedia player previously installed in a client apparatus to demultiplex such new multimedia content.

In this case, the multimedia player or its relevant applications are updated whenever the functions or the specifications of the multimedia content file or are changed, thereby carrying out the demuxing.

However, high optical transport network (OTN) costs are required if the middleware or the application is always updated to reflect every new function of the multimedia content.

Further, there is a problem of not swiftly coping with new requirements of the multimedia content because it takes time to update the middleware or the application whenever the new functions are reflected to the multimedia content.

DISCLOSURE

Technical Problem

Accordingly, an aspect of the disclosure is to provide an electronic apparatus and a method of controlling the same, in which multimedia content of a changed format can be played back without updating middleware or an application.

Further, another aspect of the disclosure is to provide an electronic apparatus, which can receive information for playing back content regardless of a format of multimedia content, and a method of controlling the same.

Technical Solution

According to an embodiment of the disclosure, an electronic apparatus includes: a signal receiver configured to receive a signal; a display; a communicator configured to communicate with an external apparatus; and a processor configured to: receive a signal of content corresponding to one format among a plurality of formats, request and receive playback information about the content corresponding to the format of the content from a server, perform a playback process with regard to the received signal of the content based on the playback information received from the server, and control the display to display an image of the content.

The processor may be configured to make a request for the playback information about the content corresponding to the format of the content to the server when a version of an application for playing back the content does not correspond to the format of the content. The playback information may include information for extracting audio and video (A/V) data from the signal of the content. The playback information may include at least one of a codec type, a resolution, a frame rate, a video format, an audio sampling rate, or a channel.

The format of the content may include a transfer protocol for providing the content.

The processor may be configured to extract data of the content from the signal of the content based on the received playback information, and perform decoding and rendering with regard to the extracted data of the content.

The processor may be configured to make a request for the playback information to the server by calling a representational state transfer application program interface (REST API).

The processor may be configured to receive information about a location, at which the image of the content based on the playback information is stored, from the server.

The processor may be configured to identify a state of communication with the external apparatus providing the signal of the content, and receive information about a location, at which the image of the content corresponding to the state of the communication is stored, from the server.

According to an embodiment of the disclosure, a computer program product includes a memory configured to store a plurality of instructions; and a processor, the instruction including: receiving a signal of content including one format among a plurality of formats, requesting and receiving playback information about the content corresponding to the format of the content from a server, performing a playback process with regard to the received signal of the content based on the playback information received from the server, and displaying an image of the content when executed by the processor.

The instruction may include making a request for the playback information about the content corresponding to the format of the content to the server when a version of an application for playing back the content does not correspond to the format of the content.

According to an embodiment of the disclosure, a method of controlling an electronic apparatus includes: receiving a signal of content including one format among a plurality of formats; requesting and receiving playback information about the content corresponding to the format of the content from a server; performing a playback process with regard to the received signal of the content based on the playback information received from the server; and displaying an image of the content.

The requesting and receiving the playback information may include making a request for the playback information about the content corresponding to the format of the content to the server when a version of an application for playing back the content does not correspond to the format of the content.

The playback information may include information for extracting audio and video (A/V) data from the signal of the content.

The playback information may include at least one of a codec type, a resolution, a frame rate, a video format, an audio sampling rate, or a channel.

The format of the content may include a transfer protocol for providing the content.

The performing the playback process may include: extracting data of the content from the signal of the content based on the received playback information; and performing decoding and rendering with regard to the extracted data of the content.

The requesting and receiving the playback information may include making a request for the playback information to the server by calling a REST API.

The method may include receiving information about a location, at which the image of the content based on the playback information is stored, from the server.

The method may include identifying a state of communication with the external apparatus providing the signal of the content; and receiving information about a location, at which the image of the content corresponding to the state of the communication is stored, from the server.

Advantageous Effects

As described above, according to the disclosure, it is possible to play back multimedia content of a changed format without updating middleware or an application.

Further, according to the disclosure, it is possible to reduce optical transport network (OTN) costs required as middleware or an application is updated, and swiftly reflect new functions for multimedia content.

BEST MODE

Below, embodiments of the disclosure will be described in detail with reference to the accompanying drawings so as to be easily realized by a person having ordinary knowledge in the art to which the disclosure pertains. The disclosure may be embodied in various forms, and not limited to the embodiments set forth herein.

Figure 1:
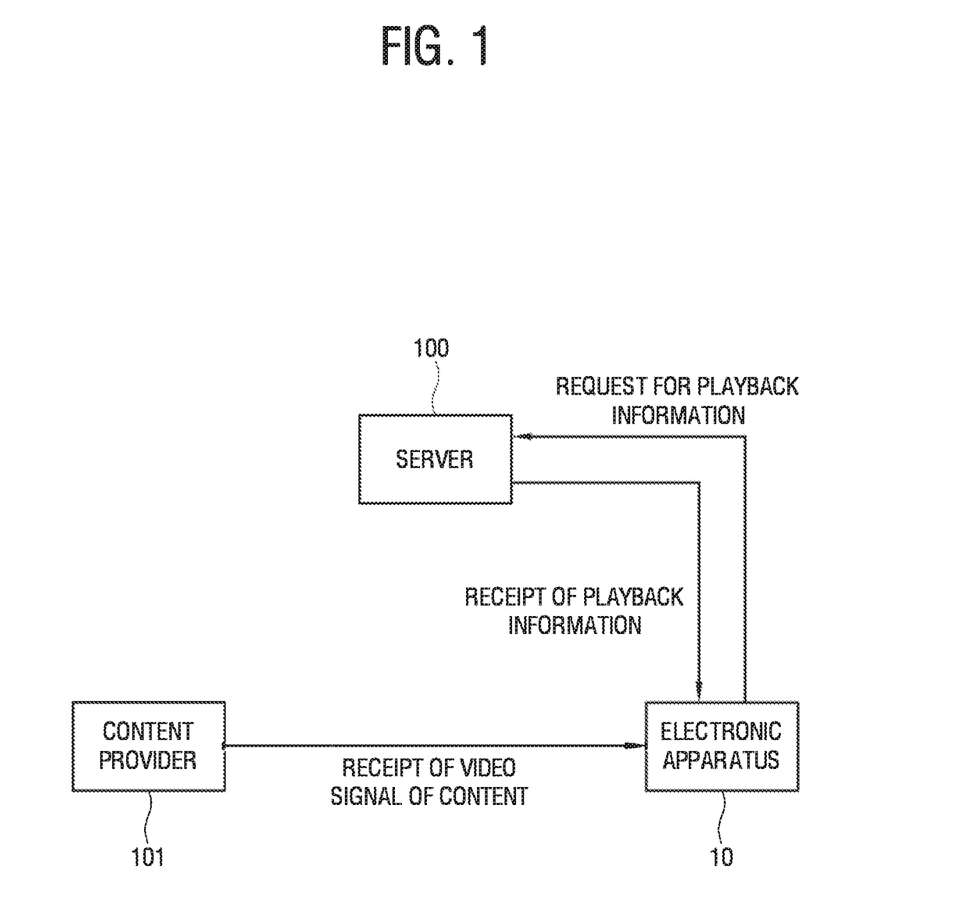
FIG. 1 is a schematic view showing a relationship among an electronic apparatus, a content provider, and a server according to an embodiment of the disclosure.

FIG. 1 is a schematic view showing a relationship among an electronic apparatus, a content provider, and a server according to an embodiment of the disclosure. As shown in FIG. 1, an electronic apparatus 10 of the disclosure receives an image signal of multimedia content from a content provider 101. The electronic apparatus 10 makes a request for information, which is needed for playing back the received multimedia content (hereinafter, referred to as 'playback information'), to a server 100, and receives the playback information corresponding to the multimedia content from the server 100.

In this embodiment, the playback information refers to information, which is obtained by partially demultiplexing the image signal of the multimedia content, as the server 100 parses the image signal of content provided from the content provider 101 in response to a request from the electronic apparatus 10. Alternatively, the playback information may be previously stored in the server 100, and then the stored information may be provided in response to the request from the electronic apparatus 10.

In this embodiment, the playback information includes information needed for extracting audio and video (A/V) data from the image signal of the content, and may for example include at least one among a codec type, a resolution, a frame rate, a video format, an audio sampling rate, or an audio channel. Thus, it is possible to extract the A/V data for decoding based on the information provided from the server, and it is possible to obtain information, which is related to A/V attributes to be referred to for decoding and rendering the image signal of the content, from the server.

The electronic apparatus 10 performs a playback process for multimedia content by referring to the playback information received from the server 100, and plays back an image of the multimedia content subjected to the playback process on a screen.

Figure 2:
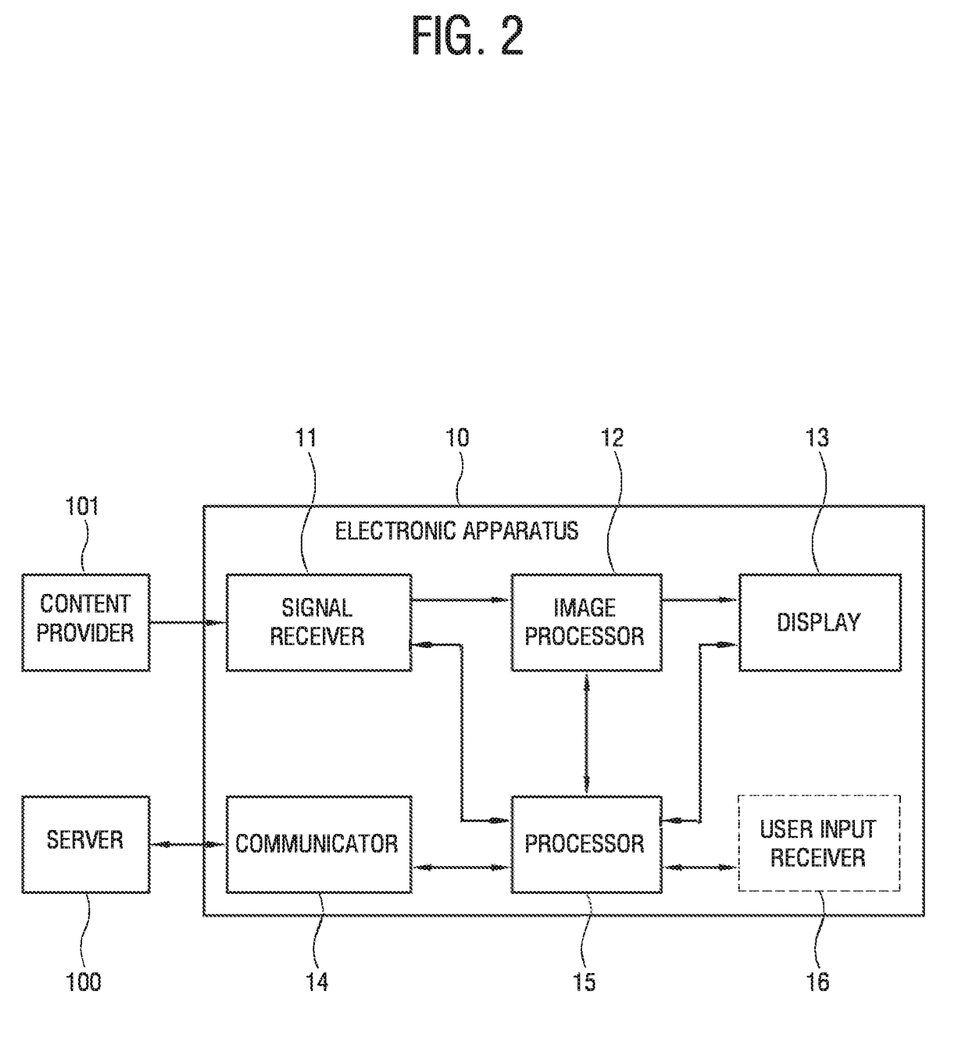
FIG. 2 is a block diagram of an electronic apparatus according to an embodiment of the disclosure.

FIG. 2 is a block diagram of an electronic apparatus according to an embodiment of the disclosure. As shown in FIG. 2, the electronic apparatus 10 of the disclosure includes a signal receiver 11, an image processor 12, a display 13, a communicator 14, and a processor 15, and is capable of communicating with the server 100 through the communicator 14. Further, the electronic apparatus 10 may further include a user input receiver 16 and a storage (not shown). The electronic apparatus 10 may for example be embodied by a television (TV), a smartphone, a tablet computer, a personal computer, etc. The elements included in the display apparatus 10 are not limited to the embodiment of the disclosure, but may exclude some elements or include other additional elements.

The signal receiver 11 may receive an image signal of content from the content provider 101, and the image signal may for example include a video or graphic signal. The signal receiver 11 may comply with various standards according to the formats of broadcast and image signals to be received therein and the types of the electronic apparatus 10. For example, the signal receiver 11 may be embodied by a tuner that receives a satellite signal or a radio frequency (RF) broadcast signal from a broadcasting station.

The image processor 12 performs a preset signal processing process with regard to an image or broadcast signal received in the signal receiver 11. As examples of the signal processing process performed in the image processor 12, there are demultiplexing, decoding, de-interlacing, scaling), noise reduction, detail enhancement, etc. and there are no limits to the kinds of signal processing processes. The image processor 12 may be embodied by a system-on-chip (SOC) where such various functions are combined, or an image processing board where individual elements for performing the processes independently of each other are mounted.

The display 13 displays an image based on the image signal or the broadcast signal processed in the image processor 12. There are no limits to the type of the display 13, and the display 13 may be embodied in various types such as a plasma display panel (PDP), a liquid crystal display (LCD), organic light emitting diodes (OLED), flexible display, etc.

The communicator 14 communicates with the server 100 through wireless or wired communication methods. The communicator 14 may communicate with the server 100 through the wired communication method such as Ethernet or the like, or the wireless communication method such as Wi-Fi, Bluetooth, etc. using a wireless router. The communication method of the communicator 14 is not limited to these methods, but may include another communication method.

The user input receiver 16 receives a user input for controlling at least one function of the electronic apparatus 10. For instance, the user input receiver 16 may receive a user input for selecting a part of a user interface displayed on the display 13. The user input receiver 16 may be embodied in the form of an input panel provided on an outer side of the electronic apparatus 10 or a remote controller using infrared rays for communicating with the electronic apparatus 10. Further, the user input receiver 16 may be embodied by a keyboard, a mouse, etc. connecting with the electronic apparatus 10, or may be embodied by a touch screen provided in the electronic apparatus 10.

According to an embodiment, the user input receiver 16 may receive a user input from a mobile device (not shown) communicating with the electronic apparatus 10 by a Wi-Fi, Bluetooth, or infrared communication method. In this case, the mobile device may be provided as a smartphone or the like, and may for example transmit a user input to the electronic apparatus 10 by installing a remote control application, executing the remote control application, and touching a button or the like for controlling the operation of the electronic apparatus 10.

The storage (not shown) includes a first memory (not shown) and a second memory (not shown). The first memory is embodied by a flash memory or the like nonvolatile memory that retains data regardless of whether the electronic apparatus 10 is powered on or off.

The first memory is configured to store a plurality of instructions for at least one executable program. The first memory allows the plurality of stored instructions to be read, written, edited, deleted, updated, etc.

The second memory refers to a high-speed buffer memory provided between the first memory and the processor 15, and is called a cache memory or a local memory. The second memory is faster than the flash memory, and is directly accessible by the processor 15. The second memory refers to a storage area in which a plurality of instructions for a program or data frequently accessed by the processor are stored to be instantly usable without being repetitively searched, and may for example be embodied by a random access memory (RAM). According to an embodiment, the second memory may for example be integrally provided in the processor 15.

The processor 15 performs a control process for controlling a plurality of functions to be carried out by the electronic apparatus 10. The processor 15 may be embodied by a central processing unit (CPU), and covers three areas for control, operation and register. The control area analyzes the plurality of instructions stored in the first memory, and instructs the elements of the electronic apparatus 10 to work based on meaning of the analyzed command. The operation area performs arithmetic and logical operation, and performs the operation needed for controlling the elements of the electronic apparatus 10 to work as instructed by the control area. The register area refers to a memory area configured to store pieces of information needed while the plurality of instructions is running in the CPU, and is configured to store instructions and pieces of data for the elements of the electronic apparatus 10 and store results of operation.

The processor 15 executes a plurality of instructions of at least one program stored in the first memory and the second memory, and may for example execute an operating system of the electronic apparatus 10, a security program of digital rights management (DRM) or conditional access system (CAS), etc., a client application, a web-based application, and an Internet communication application, etc.

According to an embodiment, the electronic apparatus 10 may download and execute the instruction stored in a separate computer program product (not shown), make a request for the playback information corresponding to the format of the content to the server 100, and perform an operation for a playback process based on the received playback information.

According to an embodiment, the computer program product includes a memory in which an instruction is stored, and a processor. Here, the instruction is set to receive a signal of content having one format among a plurality of formats, makes a request for the playback information about the content corresponding to the format of the content to the server 100 and receive the playback information from the server 100, perform the playback process with regard to the signal of the received content based on the playback information received from the server 100, and display an image of the content on the display 13, when executed by the processor.

According to an embodiment, the instruction may be set to make a request for the playback information about the content corresponding to the format of the content to the server 100, when the application for playing back the content does not match the format of the content. Thus, when the format of the multimedia content is changed and not playable back in an application of an old version, it is possible to obtain the playback information suitable for the version of the application.

Figure 3:
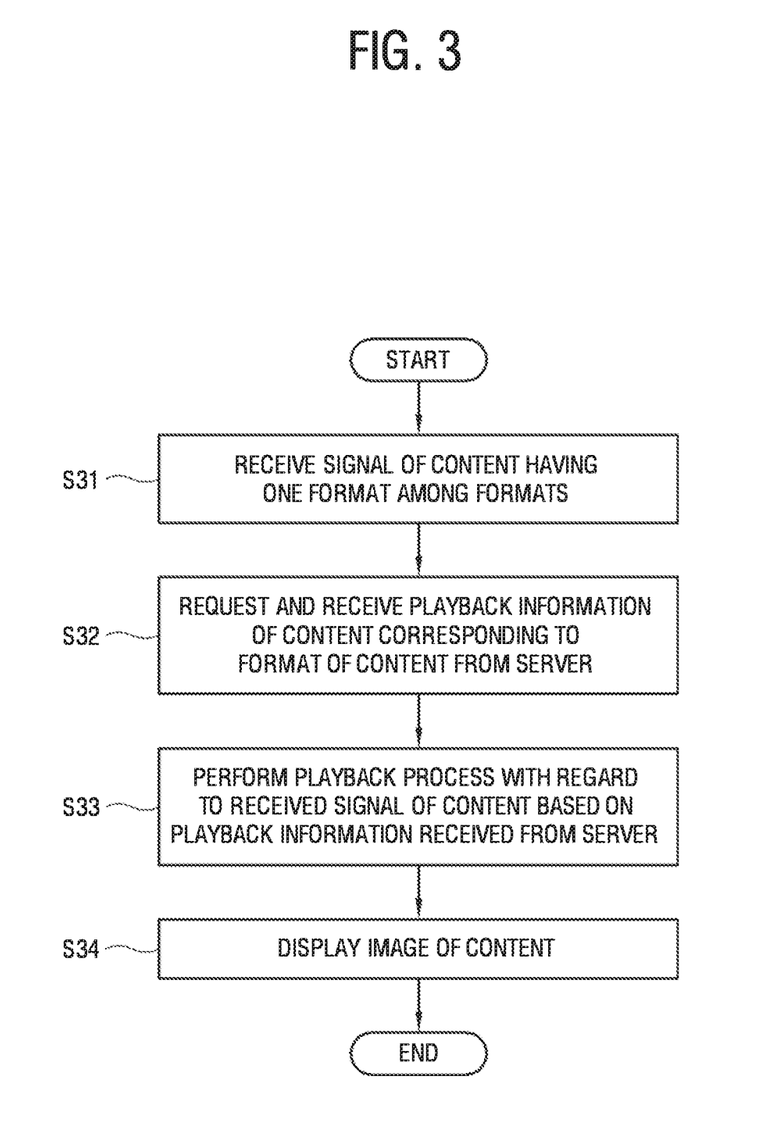
FIG. 3 is a flowchart showing a method of controlling an electronic apparatus according to an embodiment of the disclosure.

According to an embodiment of the disclosure, the operations of the processor 15 are shown in the flowchart of FIG. 3. First, at operation S31, the processor 15 controls the signal receiver 11 to receive a signal of content having one format among the plurality of formats. In this case, the received signal of the content may include at least one of information about a transfer protocol corresponding to the format of the content, or information about the version of the application for playing back the content.

Next, at operation S32, the processor 15 makes a request for the playback information about the content corresponding to the format of the content to the server 100 and receives the playback information from the server 100.

Here, the format of the content may include the transfer protocol for providing the content. For instance, when specifications of a multimedia content file provided from the content provider 101 are updated, for example, added with new functions such as a high data rate (HDR), hypertext transfer protocol (HTTP) live streaming (HLS), dynamic adaptive streaming over HTTP (DASH), etc., the multimedia content has a new format such as an updated transfer protocol. Thus, when new functions or specifications are added to the multimedia content in the content provider, the format of the multimedia content may include a changed transfer protocol.

According to an embodiment, operation of identifying whether or not the version of the application for playing back the content matches the format of the content is added before the operation S32, and then the operation S32 may be performed based on this identification. For instance, when the version of the application does not match the format of the content, the processor 15 may make a request for the playback information about the content corresponding to the format of the content to the server 100.

The processor 15 may use a predetermined function of the application to play back the content, in which the function of the application corresponding to the version of the content is varied depending on the version of the content provided by the content provider 101. Therefore, the application including a matching function needs to be used for playing back the content, and the functions of the application may be managed according to the versions of the application.

The processor 15 may identify whether the information about the transfer protocol included in the signal of the content received in the operation S31 or information about the version of the application matches the version of the application to be used for playing back the content in the electronic apparatus 10.

The processor 15 manages a correspondence between the transfer protocol of the content and the matching version of the application in a previously stored table, and identifies whether the format of the received content matches the version of the application for playing back the content based on the stored correspondence.

For instance, when a predetermined application is used to execute multimedia content received from the content provider 101 but the version of the application does not match the format of the content, it is impossible to play back the content.

For instance, when the format of the content provided by the content provider 101 is updated, for example, added with a new function such as HDR, HLS, DASH, etc., an application having a version updated corresponding to the update can support the new function but an application having a version that is not updated cannot support the new function and properly play back the content.

Thus, the processor 15 performs operation to identify whether the version of the application running in the electronic apparatus 10 matches the format of the received content, and makes a request for the playback information about the content suitable for the version of the application to the server 100 so as to play back the content when the version of the application does not match the format of the received content as an identification result.

Next, at operation S33, the processor 15 performs a playback process with regard to the content received from the content provider 101, based on the playback information received from the server 100.

Here, the operation S33 may include operation of extracting data of the content from a signal of the content based on the playback information received from the server 100, and operation of decoding and rendering the extracted data of the content.

Last, at operation S34, the processor 15 displays an image of the content completely subjected to the playback process on the display 13. In other words, reference information provided from the server may be used to play back the multimedia content.

As described above, according to the disclosure, it is possible to play back the multimedia content of the changed format without updating middleware or an application. Further, it is possible to receive information for playing back content regardless of the format of the multimedia content.

Figure 4:
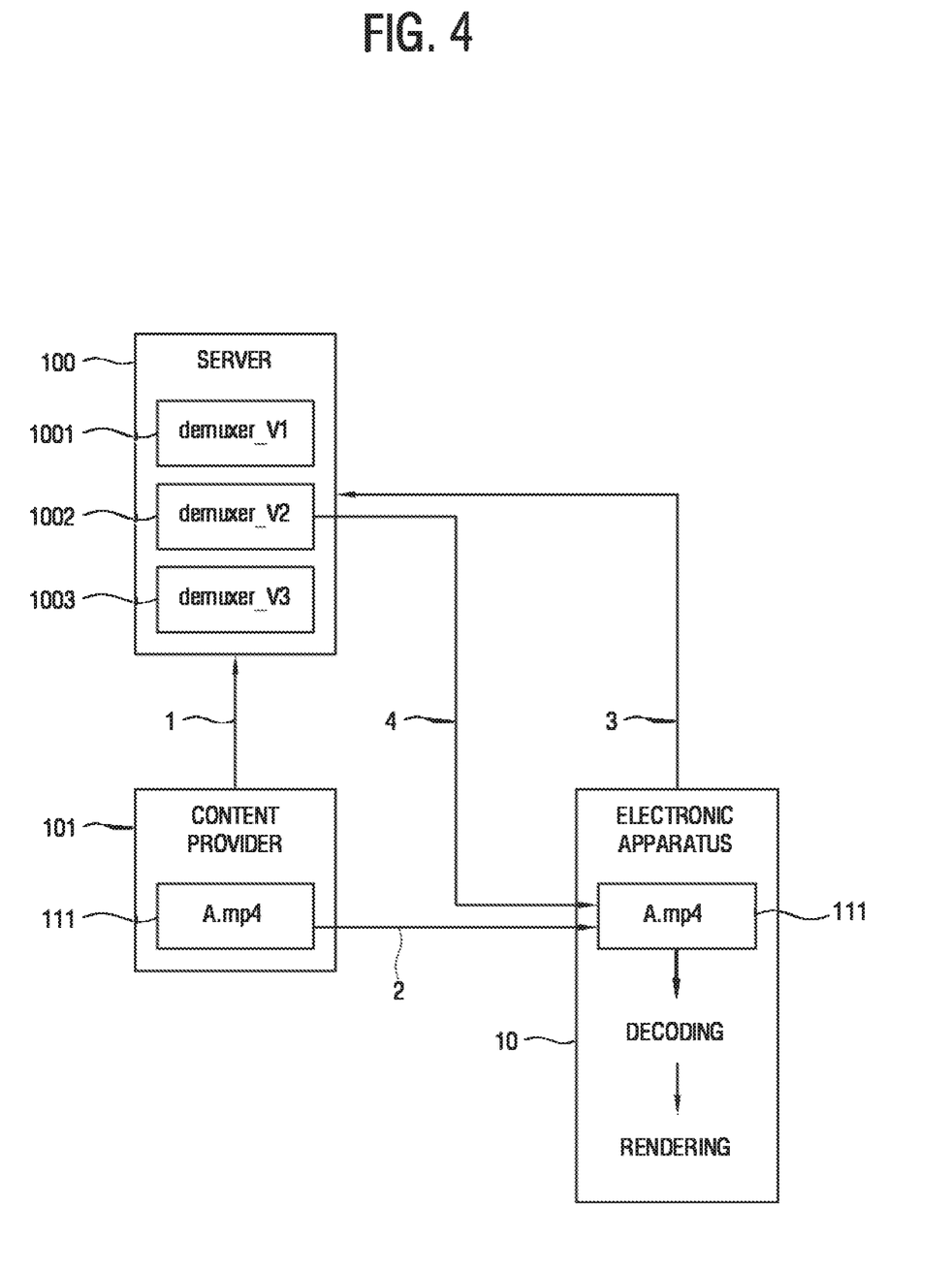
FIG. 4 illustrates an example of data flow among an electronic apparatus, a content provider, and a server to play back multimedia content according to an embodiment of the disclosure.

FIG. 4 illustrates an example of data flow among an electronic apparatus, a content provider, and a server to play back multimedia content according to an embodiment of the disclosure. The illustrated example shows the data flow in more detail among the electronic apparatus 10, the content provider 101, and the server 100 of FIG. 1, in which the description of the data flow among the apparatuses are based on the operations of FIG. 3.

In the illustrated example, the data flow between the content provider 101 and the electronic apparatus 10 corresponds to the operation S31 of FIG. 3, and the data flow between the electronic apparatus 10 and the server 100 corresponds to the operations S32, S33 and S34 of FIG. 3.

According to an embodiment, the processor 15 of the electronic apparatus 10 receives multimedia content, e.g. a file 111 of 'A.mp4' from the content provider 101 (2). In this case, the file 111 of 'A.mp4' includes a header including a format of the content or information about the format, and A/V data.

The processor 15 identifies whether the version of the application executed for playing back the received file 111 of 'A.mp4' matches the format of the file 111 of 'A.mp4' provided from the content provider 101. As a result of the identification, when the version of the application does not match the format of the file 111 of 'A.mp4', a request for the playback information about the file 111 of 'A.mp4' suitable for the version of the application is made to the server 100 (3) so that the file 111 of 'A.mp4' can be played back.

According to an embodiment, the processor 15 may make the request for the playback information needed to play back the file 111 of 'A.mp4' to the server 100 by default (3) without the foregoing operation of identifying whether the version of the application matches the file 111 of 'A.mp4'.

When the request for the playback information about the file 111 of 'A.mp4' is made to the server 100, the processor 15 transmits information about the version of the application to the server 100.

Thus, the server 100 makes a request for the file 111 of 'A.mp4', which having the format executable in the current version of the application of the electronic apparatus 10, to the content provider 101, and provides the playback information of the file 111 of 'A.mp4', which is obtained by parsing the file 111 of 'A.mp4' received from the content provider 101 as requested, to the electronic apparatus 10.

According to an embodiment, the server 100 stores pieces of playback information according to versions of the file 111 of 'A.mp4' changeable in the content provider 101 (1). For instance, whenever the specifications of the file 111 of 'A.mp4' are updated or added with new functions such as HDR, HLS, DASH, etc., i.e. whenever the format of the file 111 of 'A.mp4' is changed, the content provider 101 transmits the file 111 of 'A.mp4' having the changed format to the server 100.

In this case, the server 100 stores the playback information reconstructed by parsing the header of the file 111 of 'A.mp4' having the changed format. For instance, the server 100 includes demuxers 1001, 1002 and 1003 corresponding to the versions of the file 111 of 'A.mp4' which are different in format from one another, and provides the playback information processed by the demuxer 1002 corresponding to the version, i.e. the format of the file 111 of 'A.mp4' to the electronic apparatus 10 when the electronic apparatus 10 makes a request for the playback information about the file 111 of 'A.mp4' (4).

According to an embodiment, the server 100 may receive information about the version of the application corresponding to the version of the file 111 of 'A.mp4' when the file 111 of 'A.mp4' having the changed format is received from the content provider 101, and previously store a correspondence between them. Thus, it is possible to provide the playback information suitable for the version of the file 111 of 'A.mp4' corresponding to the version of the application provided from the electronic apparatus 10.

Based on the playback information provided from the server 100 as described above, the electronic apparatus 10 may extract the A/V data from the file 111 of 'A.mp4', and decode and render the extracted data to be displayed on the screen.

As described above, the electronic apparatus 10 according to the disclosure can receive the playback information corresponding to the version of the application from the server 100 and perform the playback process without updating the application even though the format of the content provided by the content provider 101 is changed.

Figure 5:
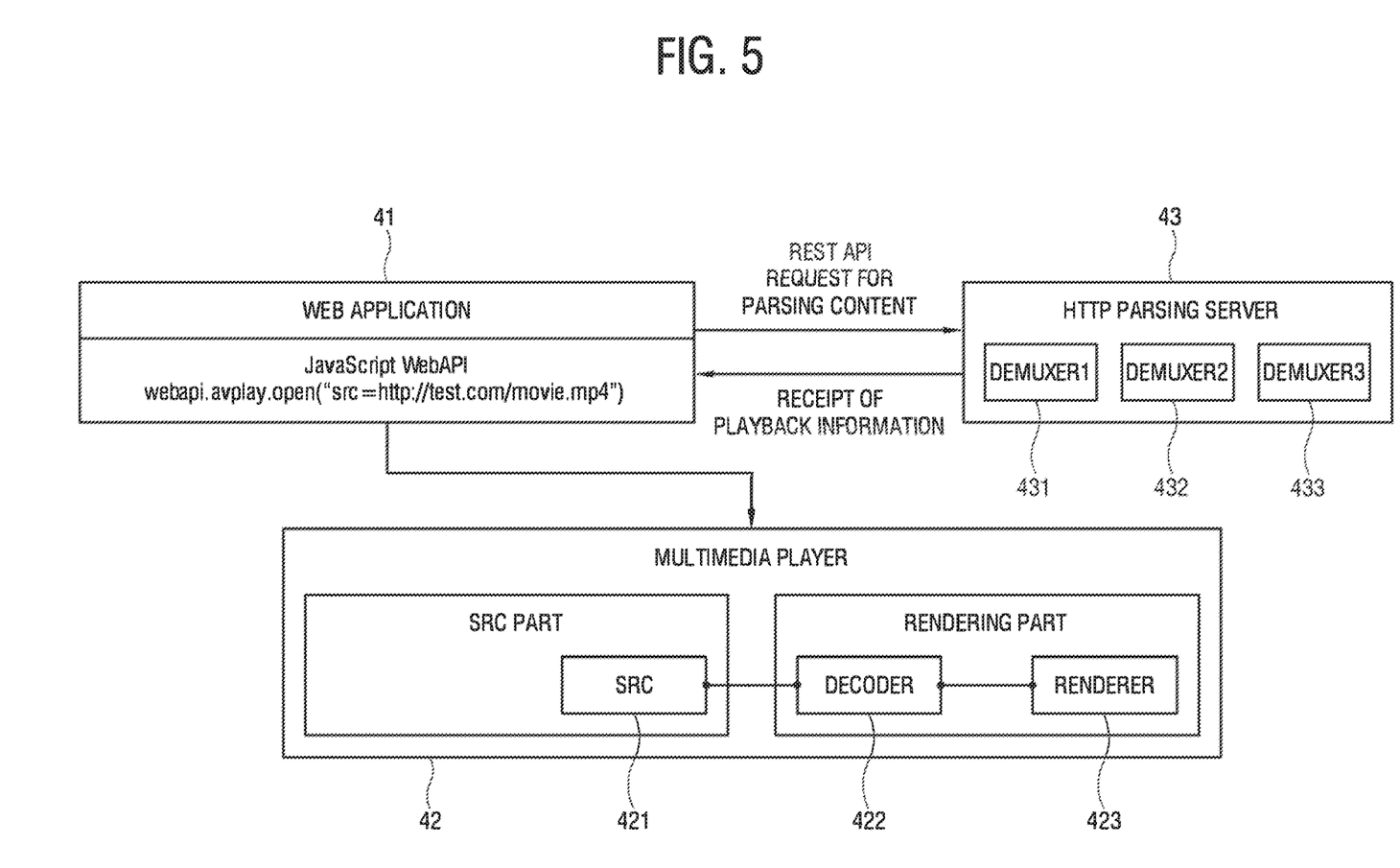
FIG. 5 illustrates an example of data flow among a web application, a multimedia player, and a hypertext transfer protocol (HTTP) parsing server according to an embodiment of the disclosure.

FIG. 5 illustrates an example of data flow among a web application, a multimedia player, and a HTTP parsing server according to an embodiment of the disclosure. In FIG. 5, a relationship between the electronic apparatus 10 and the server 100 shown in FIG. 4 will be described in more detail.

In the illustrated example, the electronic apparatus 10 may play back the multimedia content provided from the content provider 101, by executing a multimedia player 42 through a web application 41.

The multimedia player 42 is configured to play back the multimedia content, and includes an SRC 421 stored with received content, a decoder 422 related to the playback process of the content, and a renderer 423.

The HTTP parsing server 43 embodies a plurality of demuxers 431, 432 and 433 according to versions of multimedia content. According to an embodiment, the HTTP parsing server 43 embodies the plurality of demuxers 431, 432 and 433 to respectively correspond to the formats of the content whenever the format of the content is changed as new functions are added to or specifications are updated in the multimedia content provided by the content provider 101.

Here, the plurality of demuxers 431, 432 and 433 are provided respectively corresponding to the versions of the web application 41 so that the web application 41 can execute content of different formats through the multimedia player 42.

The web application 41 identifies whether the format of the received multimedia content corresponds to the version of the web application 41.

As a result of identification, when the format of the multimedia content does not correspond to the web application 41, the web application 41 calls a representational state transfer application program interface (REST API), thereby making a request for the playback information about the received multimedia content to the HTTP parsing server 43. In this case, the playback information refers to information about attributes of an image signal obtained by parsing a header included in the image signal of the content, and is used to separate the A/V data to be subjected to the playback process. Thus, reference information for playing back the multimedia content through the web application is requested through the API.

The web application 41 transmits information about the version of the web application 41 when the playback information about the content is requested to the HTTP parsing server 43.

Thus, the web application 41 receives the playback information processed by a demuxer1 431 suitable for the web application 41 from the HTTP parsing server 43, and transmits the received playback information to the multimedia player 42.

The multimedia player 42 separates the A/V data from the multimedia content based on the playback information received from the web application 41, and then performs the playback process through the decoder 422 and the renderer 423.

As described above, according to the disclosure, it is possible to play back content by adding or updating only the demuxer embodied by the HTTP parsing server 43 without updating the application or the middleware when specifications are updated in or new functions are added to the content.

Figure 6:
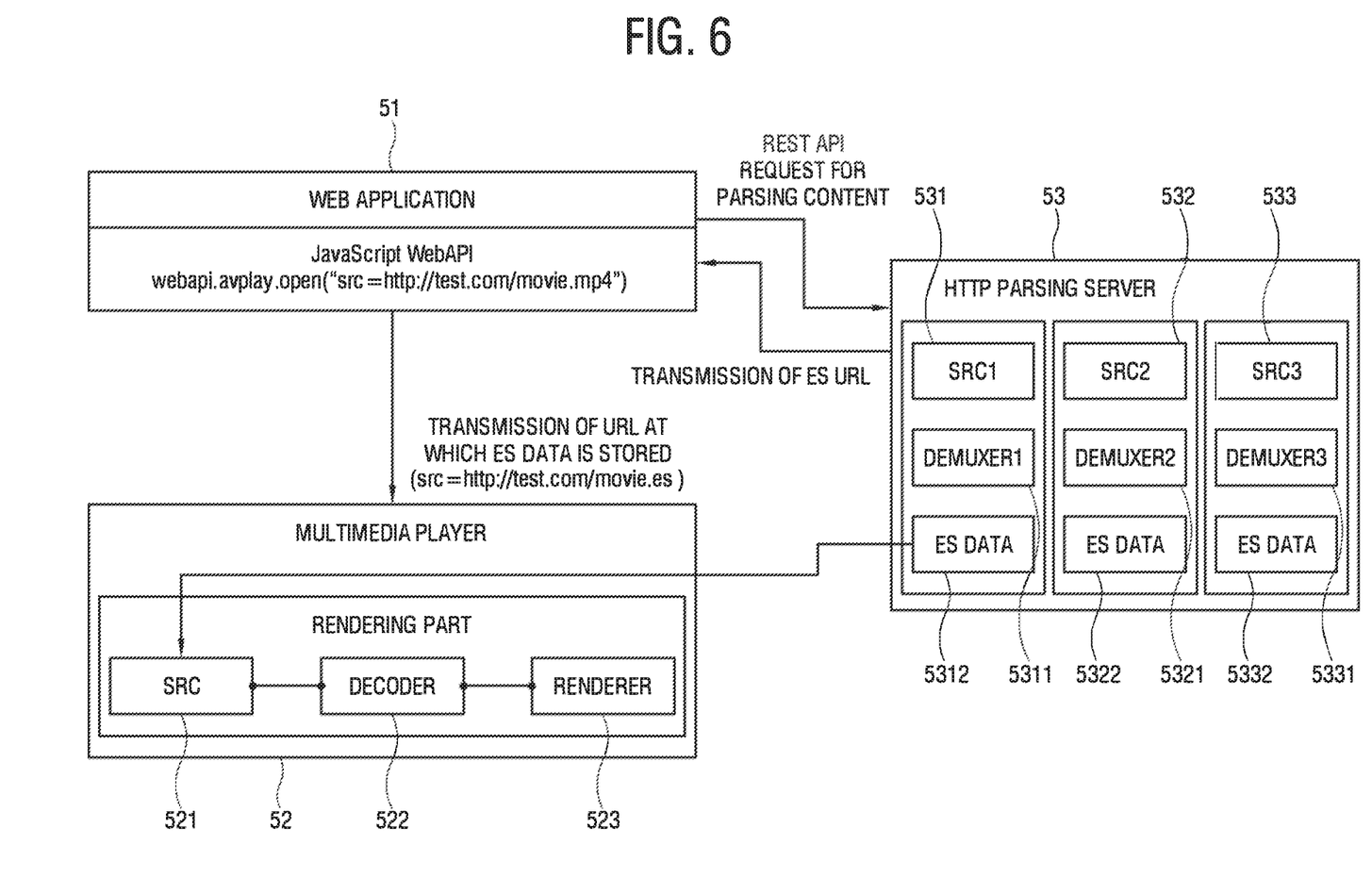
FIG. 6 illustrates an example of data flow among a web application, a multimedia player, and an HTTP parsing server according to an embodiment of the disclosure.

FIG. 6 illustrates an example of data flow among a web application, a multimedia player, and a hypertext transfer protocol (HTTP) parsing server according to an embodiment of the disclosure. In FIG. 6, it will be described that the SRC is additionally embodied in a HTTP parsing server 53 among the elements described with reference to FIG. 5.

In the illustrated example, the electronic apparatus 10 may play back multimedia content provided from the content provider 101 by executing a multimedia player 52 through a web application 51.

The multimedia player 52 is configured to play back the multimedia content, and includes an SRC 521 stored with content, a decoder 522 related to the playback process of the content, and a renderer 523.

The HTTP parsing server 53 embodies a plurality of SRCs 531, 532 and 533 and a plurality of demuxers 5311, 5321 and 5331 according to versions of multimedia content. According to an embodiment, the HTTP parsing server 53 embodies the plurality of SRCs 531, 532 and 533 and the plurality of demuxers 5311, 5321 and 5331 to respectively correspond to the formats of the content whenever the format of the content is changed as new functions are added to or specifications are updated in the multimedia content provided by the content provider 101.

The web application 51 identifies whether the format of the received multimedia content corresponds to the version of the web application 51.

As a result of identification, when the format of the multimedia content does not correspond to the web application 51, the web application 51 calls a REST API, thereby making a request for the playback information about the multimedia content and a uniform resource locator (URL) of the content to be played back to the HTTP parsing server 53. In this case, the playback information refers to information about attributes of an image signal obtained by parsing a header included in the image signal of the content, and is used to separate the A/V data to be subjected to the playback process.

The web application 51 transmits information about the version of the web application 51 when the playback information about the content and the URL to be played back are requested to the HTTP parsing server 53.

The HTTP parsing server 53 parses a header from an image signal of content stored in an SRC1 531 by a demuxer1 5311 corresponding to the version of the web application 51 among the plurality of demuxers 5311, 5321 and 5331 in response to the request of the web application 51.

The HTTP parsing server 53 generates and stores elementary stream (ES) data 5312 in the form to be directly played back in the multimedia player 52, based on the playback information obtained by parsing content through a demuxer 1 5311. Likewise, ES data 5322 and ES data 5332 embody data respectively processed to be playable back by parsing the content through a demuxer2 5321 and a demuxer3 5331.

The HTTP parsing server 53 transmits information about a location at which the ES data 5312 is stored, for example, a URL at which the ES data 5312 is stored, to the web application 51. In other words, instead of the reference information for executing the multimedia content, an execution path for the content image processed to be playable back based on the reference information may be given.

The web application 51 may transmit the URL, at which the ES data 5312 transferred from the HTTP parsing server 53 is stored, to the multimedia player 52, and the multimedia player 52 may directly play back the ES data 5312 through the URL.

As described above, according to the disclosure, it is possible to execute content by receiving an execution path of the content processed to be playable back from the HTTP parsing server 53, without a separate playback process.

Figure 7:
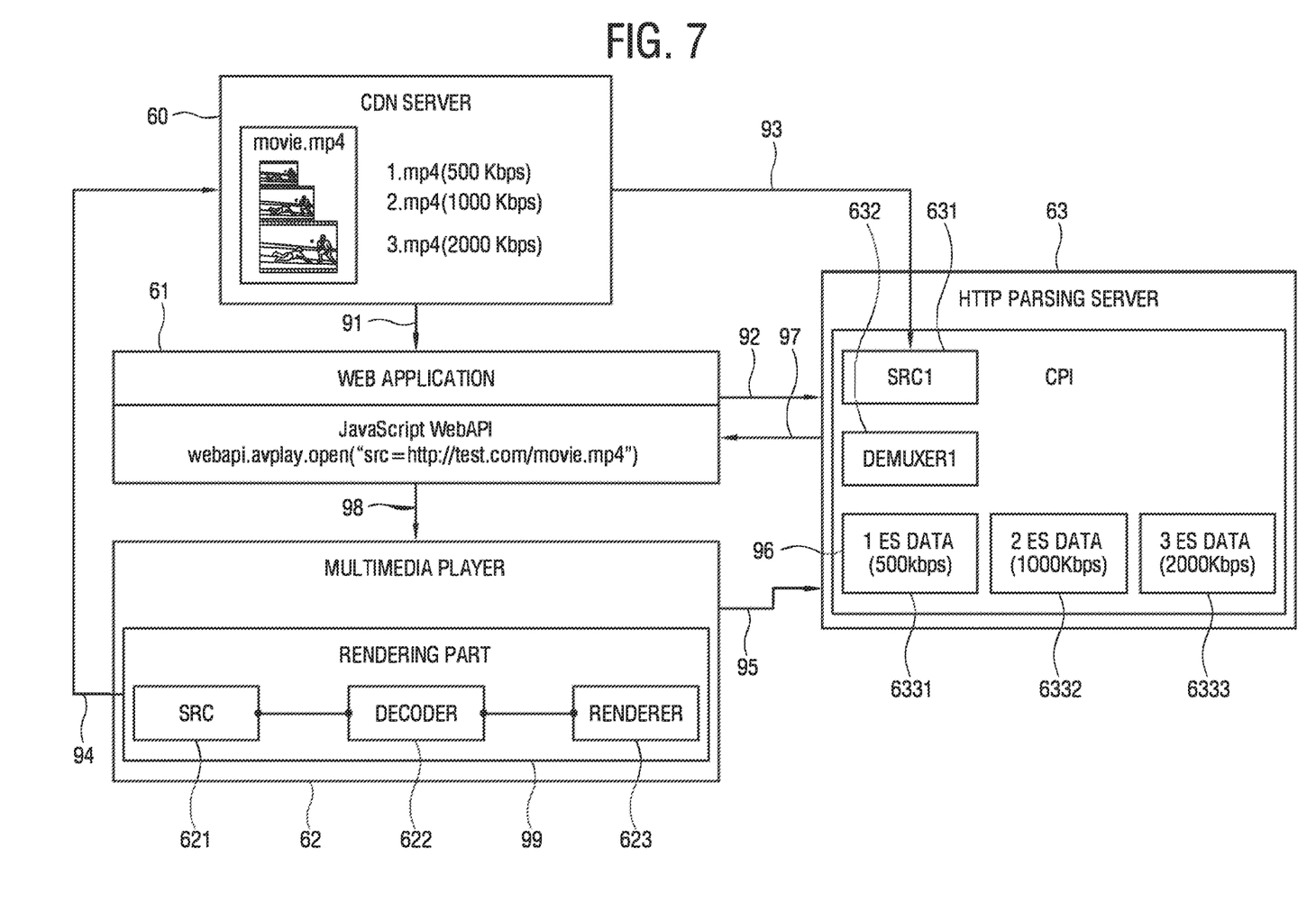
FIG. 7 illustrates an example of data flow among a content delivery network (CDN) server, a web application, a multimedia player, and an HTTP parsing server according to an embodiment of the disclosure.

FIG. 7 illustrates an example of data flow among a content delivery network (CDN) server, a web application, a multimedia player, and an HTTP parsing server according to an embodiment of the disclosure. In FIG. 7, it will be described that adaptive streaming is applied to the configuration described in FIG. 6.

In the illustrated example, the electronic apparatus 10 may play back the multimedia content provided from the content provider 101, by executing a multimedia player 62 through a web application 61.

The multimedia player 62 is configured to play back the multimedia content, and includes an SRC 621 stored with content, a decoder 622 related to the playback process of the content, and a renderer 623.

The web application 61 receives the multimedia content provided from the content provider 101 through the CDN server 60 (91).

The web application 61 identifies whether the format of the received multimedia content corresponds to the version of the web application 61.

As a result of the identification, when the format of the multimedia content does not correspond to the web application 61, the web application 61 calls a REST API, thereby making a request for the playback information about the multimedia content and a URL of the content to be played back to a HTTP parsing server 63 (92).

The HTTP parsing server 63 generates ES data processed to be playable back, by parsing a multimedia content file transmitted through the CDN server 60 (93).

The multimedia player 62 checks a network bandwidth between the CDN server 60 and the multimedia player (94), and transmits information about the network bandwidth, performance, etc. to the HTTP parsing server 63 by calling the REST API (95).

Thus, the HTTP parsing server 63 may for example generate ES data 6331 corresponding to a transmission speed of 500 kbps, based on information about the network bandwidth between the CDN server 60 and the multimedia player 62 received from the multimedia player 62 (96).

For instance, the plurality of pieces of ES data 6331, 6332 and 6333 may be for example embodied to respectively correspond to transmission speeds of 500 kbps, 1000 kbps and 2000 kbps, in a changed form of the content data parsed by the corresponding demuxer 632 and processed to be playable back.

The HTTP parsing server 63 transmits information about a location at which the ES data 6331 is stored, for example, the URL of the ES data 6331 to the web application 61 (97).

The web application 61 transmits the URL of the CDN server 60 and the URL of the ES data 6331 from the HTTP parsing server 63 to the multimedia player 62 (98), and the multimedia player 62 directly plays back the ES data 6331 through the URL.

As described above, according to the disclosure, the transmission speed of the content is taken into account, and the execution path of the content processed to be playable back corresponding to the transmission speed is received from the HTTP parsing server 63, thereby executing the content without a separate playback process. In other words, it is possible to receive an execution path of a content image processed to be playable back in consideration of a network bandwidth between a client and an apparatus of providing multimedia content.

Figure 8:
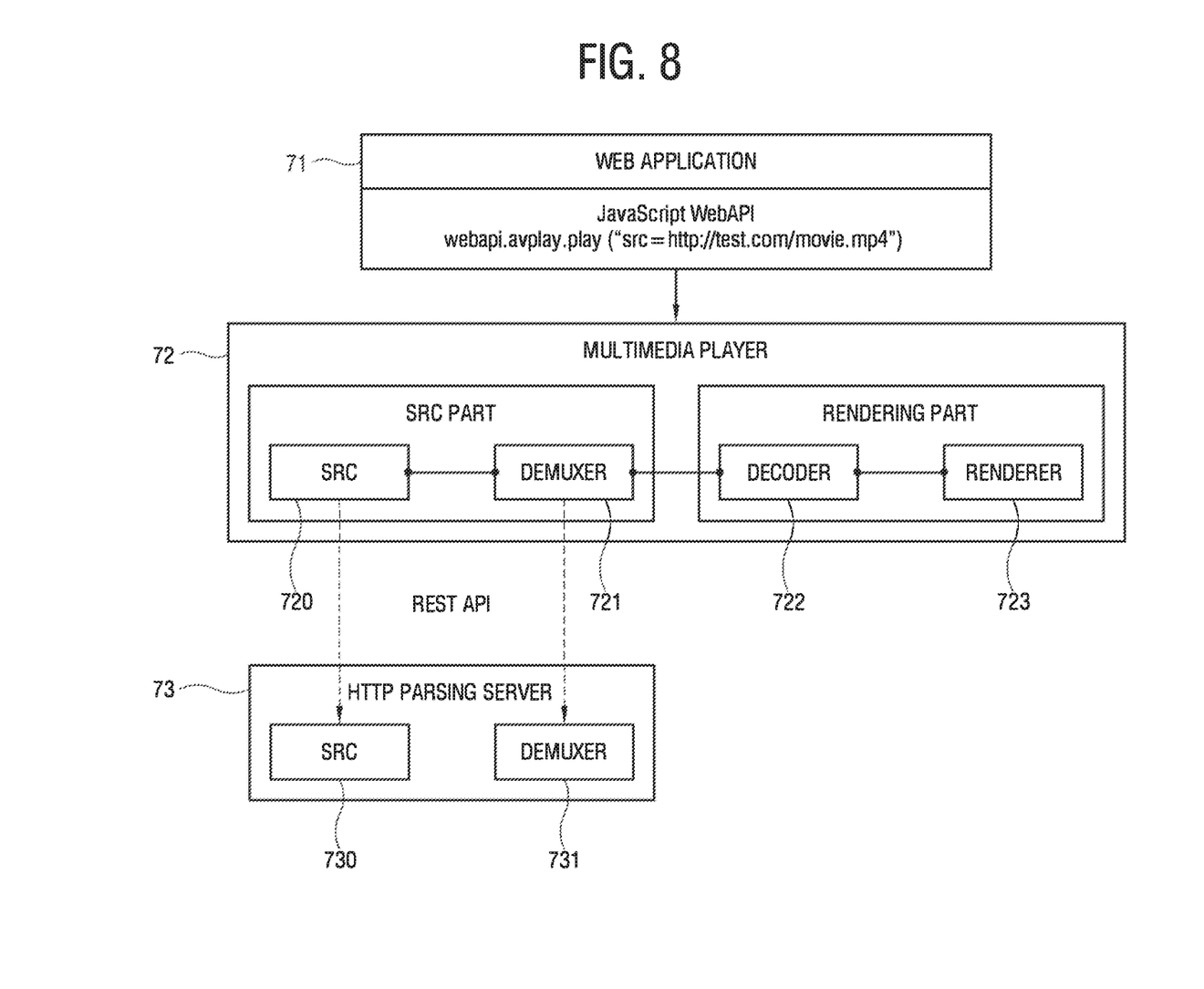
FIG. 8 illustrates an example of data flow among a web application, a multimedia player, and an HTTP parsing server according to an embodiment of the disclosure.

FIG. 8 illustrates an example of data flow among a web application, a multimedia player, and an HTTP parsing server according to an embodiment of the disclosure. Unlike FIGS. 5 to 7, FIG. 8 shows a structure that a multimedia player 72 makes a request for processing content to be playable back to a HTTP parsing server 73 without aid of a web application 71.

In the illustrated example, the electronic apparatus 10 can play back multimedia content provided from the content provider 101 by executing the multimedia player 72 through the web application 71.

The multimedia player 72 is configured to play back the multimedia content, and includes an SRC 720, a demuxer 721, a decoder 722, and a renderer 723.

The multimedia player 72 requests the HTTP parsing server 73 to perform processes corresponding to operations of the SRC 720 and the demuxer 721 by calling a REST API.

In response to the request from the multimedia player 72, the HTTP parsing server 73 receives and stores content from the SRC 730 and parses content in a demuxer 731, thereby obtaining playback information. In this case, the SRC 730 and the demuxer 731 are embodied to correspond to the format of the provided content, for example, the specification, function, etc. of the content.

Thus, the multimedia player 72 receives the playback information from the HTTP parsing server 73, and performs the playback process through the decoder 722 and the renderer 723.

As described above, according to an embodiment of the disclosure, the playback information about the content is not requested to the HTTP parsing server 73 through the web application 71, but the multimedia player 72 makes the request for the HTTP parsing server 73 so that the SRC 730 and the demuxer 731 can perform a previous process for actual playback.

According to such an embodiment of the disclosure, it is possible to play back the multimedia content of the changed format without updating the middleware or the application. Further, it is possible to receive the information about the playback of the multimedia content regardless of the formats of the content.

Although a few exemplary embodiments have been shown and described, it will be appreciated that changes may be made in these exemplary embodiments without departing from the scope defined in the appended claims.

The invention claimed is:

1. An electronic apparatus comprising:
a signal receiver configured to receive a signal;
a display;
a communicator configured to communicate with an external apparatus; and
a processor configured to:
receive a signal of content corresponding to one format among a plurality of formats,
request and receive playback information about the content corresponding to the format of the content from a server,
perform a playback process with regard to the received signal of the content based on the playback information received from the server, and
control the display to display an image of the content.

2. The electronic apparatus according to claim 1, wherein the processor is configured to make a request for the playback information about the content corresponding to the format of the content to the server based on identifying that a version of an application for playing back the content does not correspond to the format of the content.

3. The electronic apparatus according to claim 1, wherein the playback information comprises information for extracting audio and video (A/V) data from the signal of the content.

4. The electronic apparatus according to claim 1, wherein the playback information comprises at least one of a codec type, a resolution, a frame rate, a video format, an audio sampling rate, or a channel.

5. The electronic apparatus according to claim 1, wherein the format of the content comprises a transfer protocol for providing the content.

6. The electronic apparatus according to claim 1, wherein the processor is configured to extract data of the content from the signal of the content based on the received playback information, and perform decoding and rendering with regard to the extracted data of the content.

7. The electronic apparatus according to claim 1, wherein the processor is configured to make a request for the playback information to the server by calling a representational state transfer application program interface (REST API).

8. The electronic apparatus according to claim 1, wherein the processor is configured to receive information about a location, at which the image of the content based on the playback information is stored, from the server.

9. The electronic apparatus according to claim 1, wherein the processor is configured to identify a state of communication with the external apparatus providing the signal of the content, and receive information about a location, at which the image of the content corresponding to the state of the communication is stored, from the server.

10. A method of controlling an electronic apparatus, comprising:
receiving a signal of content corresponding to one format among a plurality of formats;
requesting and receiving playback information about the content corresponding to the format of the content from a server;
performing a playback process with regard to the received signal of the content based on the playback information received from the server; and
displaying an image of the content.

11. The method according to claim 10, wherein the requesting and receiving the playback information comprises making a request for the playback information about the content corresponding to the format of the content to the server based on identifying that a version of an application for playing back the content does not correspond to the format of the content.

12. The method according to claim 10, wherein the playback information comprises information for extracting audio and video (A/V) data from the signal of the content.

13. The method according to claim 10, wherein
the playback information comprises at least one of a codec type, a resolution, a frame rate, a video format, an audio sampling rate, or a channel, and
the format of the content comprises a transfer protocol for providing the content.

14. The method according to claim 10, wherein the performing the playback process comprises:
extracting data of the content from the signal of the content based on the received playback information; and
performing decoding and rendering with regard to the extracted data of the content.

15. The method according to claim 10, wherein the requesting and receiving the playback information comprises making a request for the playback information to the server by calling a representational state transfer application program interface (REST API).

* * * * *